(12) United States Patent
Araki et al.

(10) Patent No.: US 8,592,499 B2
(45) Date of Patent: Nov. 26, 2013

(54) METHOD FOR PREPARING AN ORGANOPOLYSILOXANE COMPOUND AND CURING COMPOSITION USING THE COMPOUND

(71) Applicant: Shin-Etsu Chemical Co., Ltd., Chiyoda-ku (JP)

(72) Inventors: Tadashi Araki, Annaka (JP); Takafumi Sakamoto, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/684,376

(22) Filed: Nov. 23, 2012

(65) Prior Publication Data
US 2013/0137792 A1 May 30, 2013

(30) Foreign Application Priority Data

Nov. 29, 2011 (JP) ................................. 2011-260559

(51) Int. Cl.
*C08J 3/28* (2006.01)

(52) U.S. Cl.
USPC ............. 522/99; 522/33; 522/39; 522/43; 522/46; 524/588; 528/17; 528/18; 528/25; 528/28; 528/38

(58) Field of Classification Search
None
See application file for complete search history.

(56) References Cited

U.S. PATENT DOCUMENTS

| | | | | |
|---|---|---|---|---|
| 3,878,263 A | * | 4/1975 | Martin | 528/32 |
| 4,064,027 A | | 12/1977 | Gant | |
| 4,528,081 A | * | 7/1985 | Lien et al. | 522/39 |
| 4,675,346 A | | 6/1987 | Lin et al. | |
| 5,371,116 A | | 12/1994 | Sakamoto et al. | |
| 5,391,588 A | | 2/1995 | Sakamoto et al. | |
| 5,527,578 A | * | 6/1996 | Mazurek et al. | 428/41.8 |
| 5,714,524 A | * | 2/1998 | Hara et al. | 522/99 |
| 2006/0142526 A1 | * | 6/2006 | Lai et al. | 528/25 |

FOREIGN PATENT DOCUMENTS

| | | |
|---|---|---|
| EP | 0 332 400 A2 | 9/1989 |
| EP | 0 332 400 A3 | 9/1989 |
| GB | 1323869 | 7/1973 |
| JP | 52-40334 | 10/1977 |
| JP | 53-36515 | 10/1978 |
| JP | 60-104158 | 6/1985 |
| JP | 60-215009 | 10/1985 |
| JP | 2639286 | 4/1997 |
| JP | 2782405 | 5/1998 |

OTHER PUBLICATIONS

The Extended European Search Report issued May 24, 2013, in Application No./Patent No. 12007997.5-1306.

* cited by examiner

Primary Examiner — Marc Zimmer
(74) Attorney, Agent, or Firm — Oblon, Spivak, McClelland, Maier & Neustadt, L.L.P.

(57) ABSTRACT

A method for preparing an organopolysiloxane compound by mixing (A) an organopolysiloxane of the formula (1):

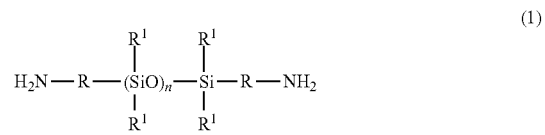

(1)

wherein $R^1$ is a monovalent hydrocarbon group and may be the same or different, R is a divalent hydrocarbon group, and n is an integer of at least 2, with (B) an organic compound of the formula (2) or (3):

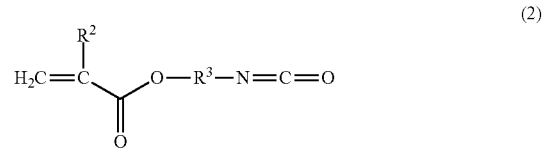

(2)

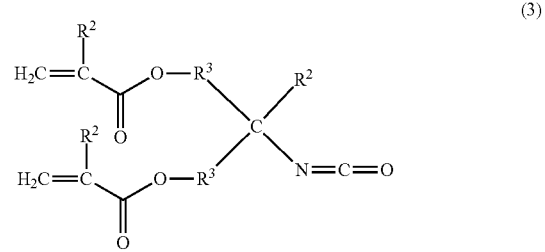

(3)

wherein $R^2$ is H or a monovalent hydrocarbon and $R^3$ is a divalent hydrocarbon and (C) an organic compound of the formula (4):

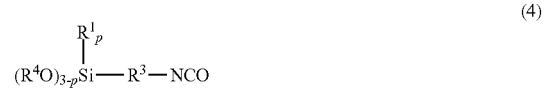

(4)

wherein $R^1$ and $R^3$, respectively, have the same meanings as defined above, $R^4$ is a monovalent hydrocarbon group, and p is 0 or 1, wherein components (A), (B) and (C) are reacted with one another under conditions that a ratio between an amino group equivalent $P_{NH}$ in component (A) and an isocyanate group equivalent $P_{NCO}$ in components (B) and (C) is such that $0.8 \leq (P_{NCO}/P_{NH})$ and a molar ratio between component (B) and component (C) is such that $0.6 \leq$ [component (B)/component (C)].

4 Claims, No Drawings

METHOD FOR PREPARING AN ORGANOPOLYSILOXANE COMPOUND AND CURING COMPOSITION USING THE COMPOUND

CROSS-REFERENCE TO RELATED APPLICATION

This non-provisional application claims priority under 35 U.S.C. §119(a) on Patent Application No. 2011-260559 filed in Japan on Nov. 29, 2011, the entire contents of which are hereby incorporated by reference.

TECHNICAL FIELD

This invention relates to a method for preparing an organopolysiloxane compound suited for use as a curing composition that is provided with both simple photocurability and room temperature curability and also to a curing composition comprising the compound.

BACKGROUND ART

It is well known that organopolysiloxanes heated in the presence of an organic peroxide are converted to silicone rubbers excellent in heat resistance, cold resistance, weatherability and electric characteristics. It is also known that organopolysiloxanes are cured by light irradiation in the presence of a photoinitiator.

In JP-B S52-40334 (Patent Document 1) and JP-A S60-104158 (Patent Document 2), for example, there are disclosed UV-curing organopolysiloxane compositions which contain a vinyl group-containing polysiloxane and a mercapto group-containing polysiloxane and are able to form a cured product through photoradical addition reaction. In JP-B S53-36515 (Patent Document 3) and JP-A S60-215009 (Patent Document 4), there are also disclosed photocurable organopolysiloxane compositions which contain an acrylic group-containing polysiloxane and a sensitizer and are able to form a cured product by photoirradiation.

In JP 2639286 (Patent Document 5), there is disclosed a photocurable organopolysiloxane composition making use of a curable organopolysiloxane compound obtained by reaction between a hydroxy-terminated organopolysiloxane and a (meth)acrylic functional alkoxysilane.

Further, in JP 2782405 (Patent Document 6), there is disclosed a photocurable organopolysiloxane composition making use of a curable organopolysiloxane compound obtained by reaction of an organopolysiloxane having a terminal hydrolyzable silyl group and an acryloxyalkylsilanol.

However, the above compositions containing both a vinyl group-containing polysiloxane and a mercapto group-containing polysiloxane have a problem on the odor and metal corrosiveness of the mercapto group, with the attendant drawback that their use is limitative.

With respect to the composition comprising an acrylic group-containing polysiloxane and a sensitizer, it is needed to use a linear polysiloxane having a high molecular weight as an acrylic group-containing polysiloxane so as to obtain a rubbery elastomer. Hence, the amount of the acrylic group positioned at terminal ends in the polysiloxane becomes relatively very small, so that curability lowers. Another disadvantage resides in that the surface portion exposed to air scarcely undergoes curing owing to the curing hindrance of oxygen. Accordingly, this sort of composition has been put into practice only for obtaining a resinous cured product by use of a polysiloxane having a relatively large amount of acrylic group, and has never been put into practical use for obtaining a rubbery elastomer at present.

Further, where a curable organopolysiloxane compound obtained by reaction between the hydroxy-terminated organopolysiloxane and a (meth)acrylic functional alkoxysilane is formed into a cured product by photoirradiation, the curability of a polymer modified with one (meth)acrylic group at each end is insufficient along with a disadvantage in that depth curability is poor.

Still further, where there is used an organopolysiloxane compound obtained by reaction between an organopolysiloxane having a terminal hydrolyzable silyl group and an acryloxyalkyl silanol, curability with photoirradiation is good. However, the acryloxyalkylsilanol that is a starting material for obtaining the curable organopolysiloxane compound is instable, thus presenting problems on the feed stability of the starting material, preparation stability and storage stability of the resulting composition.

CITATION LIST

Patent Document 1: JP-B S52-40334
Patent Document 2: JP-A S60-104158
Patent Document 3: JP-B S53-36515
Patent Document 4: JP-A S60-215009
Patent Document 5: JP 2639286
Patent Document 6: JP 2782405

SUMMARY OF INVENTION

Technical Problem

Accordingly, an object of the invention is to provide a method for preparing an organopolysiloxane compound which is cured within a short time through UV irradiation so that the compound can be conveniently used in a curing composition whose workability is advantageous over hitherto known compositions of the condensation type, thermally curing type and platinum addition reaction type and which is excellent in curability and preparation stability and is imparted with both photocurability and room temperature curability. Another object is to provide a curing composition making use of the compound mentioned above.

Solution to Problem

The inventors have made intensive studies so as to solve the above problems and, as a result, found that when (A) an organopolysiloxane compound having an amino group at opposite ends thereof, (B) an organic compound of the following general formula (2) or (3):

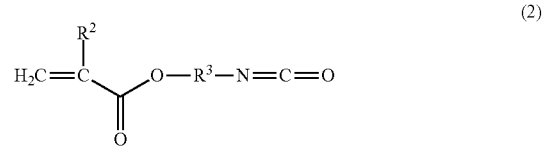

(2)

wherein $R^2$ is a hydrogen atom or a unsubstituted or substituted monovalent hydrocarbon group having 1 to 3 carbon atoms, and $R^3$ is an unsubstituted or substituted divalent hydrocarbon group having 1 to 20 carbon atoms,

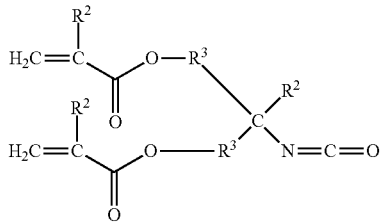
(3)

wherein $R^2$ and $R^3$, respectively, have the same meanings as set forth above, and (C) an organic compound of the following general formula (4):

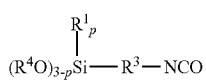
(4)

wherein $R^1$ is an unsubstituted or substituted monovalent hydrocarbon group having 1 to 10 carbon atoms, $R^3$ has the same meaning as defined above, $R^4$ is an unsubstituted or substituted monovalent hydrocarbon group having 1 to 3 carbon atoms, $R^1$, $R^3$ and $R^4$ may be the same or different, and p is 0 or 1, are mixed, the amino group and the isocyanate group rapidly react with each other at a normal temperature to form a urea bond. More particularly, a structure of the following general formula (6) or (7) is formed, for example,

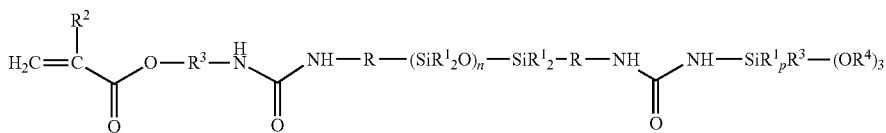
(6)

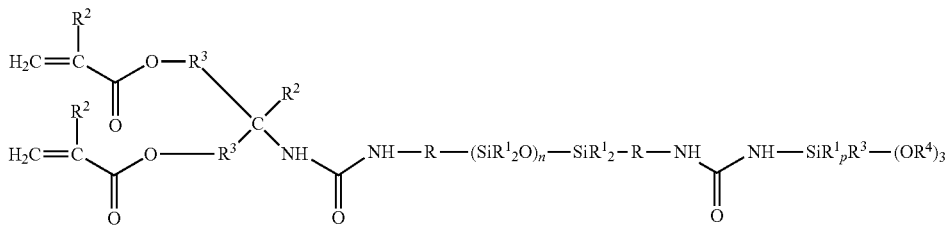
(7)

wherein R is a divalent hydrocarbon group having 1 to 10 carbon atoms, $R^1$, $R^2$, $R^3$, $R^4$, n and p, respectively, have the same meanings as defined above.

The above reaction readily occurs by mixing and thus, there can be well obtained an organopolysiloxane compound suited for use in a curing composition, which is provided with photocurability and room temperature curability at terminal ends. As a matter of course, it has been confirmed that there can be obtained a good curing composition making use of the compound.

Thus, according to one embodiment of the invention, there is provided a method for preparing an organopolysiloxane compound, which including mixing (A) an organopolysiloxane of the following formula (1):

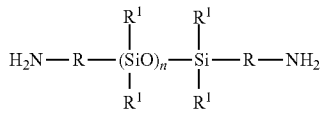
(1)

wherein $R^1$ is an unsubstituted or substituted monovalent hydrocarbon group having 1 to 10 carbon atoms and may be the same or different, R is a divalent hydrocarbon group having 1 to 10 carbon atoms, and n is an integer of at least 2, with (B) an organic compound of the following general formula (2) or (3):

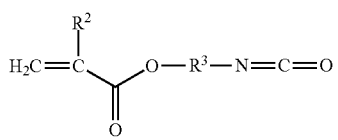
(2)

wherein $R^2$ is a hydrogen atom or an unsubstituted or substituted monovalent hydrocarbon group having 1 to 3 carbon atoms, and $R^3$ is an unsubstituted or substituted divalent hydrocarbon group having 1 to 20 carbon atoms,

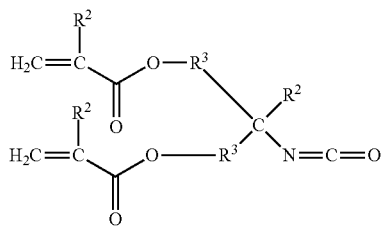
(3)

wherein $R^2$ and $R^3$, respectively, have the same meanings as defined above, and (C) an organic compound of the following general formula (4):

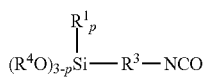

wherein $R^1$ and $R^3$, respectively, have the same meanings as defined above, $R^4$ is an unsubstituted or substituted monovalent hydrocarbon group having 1 to 3 carbon atoms, and p is 0 or 1, thereby preparing an organopolysiloxane compound, wherein components (A), (B) and (C) are reacted with one another under conditions that a ratio between an amino group equivalent $P_{NH}$ in component (A) and an isocyanate group equivalent $P_{NCO}$ in components (B) and (C) is such that $0.8 \leq (P_{NCO}/P_{NH})$ and a molar ratio between component (B) and component (C) is such that $0.6 \leq$ [component (B)/component (C)].

According to another embodiment of the invention, there is also provided a curing composition including:

(D) 100 parts by weight of an organopolysiloxane compound obtained by the preparation method by the above preparation method;

(E) 0.01 to 10 parts by weight of a photopolymerization initiator;

(F) 0.01 to 10 parts by weight of a curing catalyst; and (G) 1 to 30 parts by weight of a silane represented by the following general formula (5) or a partial hydrolyzate thereof, $$R^5{}_{4-r}SiK_r \qquad (5)$$

wherein $R^5$ is an unsubstituted or substituted monovalent hydrocarbon group having 1 to 10 carbon atoms, K is a hydrolyzable group, and r is an integer of 2 to 4.

In this case, it is preferred that 0.1 to 100 parts by weight of (H) fumed silica per 100 parts by weight of component (A) is further contained.

The invention further provides a part bonded and/or sealed with the cured product of the above curing composition.

Advantageous Effects of Invention

According to the preparation method of an organopolysiloxane compound conveniently used in a curable composition imparted with photocurability and room temperature curability thereto, workability is advantageous over those of hitherto known compositions of the condensation type, thermally curing type and platinum addition reaction type, and there can be simply obtained an intended organopolysiloxane compound in a manner of excellent preparation stability at low costs. The curing composition prepared by use of the organopolysiloxane obtained according to the preparation method of the invention allows curing within a short time by UV irradiation and is capable of being cured as condensed, so that such a deep portion as UV light would never arrive is cured with time. The use of the preparation method of the organopolysiloxane compound and the curing composition making use of the compound according to the invention is advantageous over known ones of the condensation type, thermally curing type and platinum addition reaction type. The compound is very useful when applied to compositions meeting various requirements such as for sealing agents, coating agents and potting agents.

DESCRIPTION OF EMBODIMENTS

Component (A)

The polysiloxane of component (A) having an amino group at both ends thereof is represented by the following general formula (1) and is a base oil for obtaining an organopolysiloxane compound provided with photocurability and room temperature curability at terminal ends.

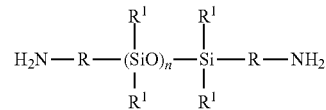

In the above formula, $R^1$ is a unsubstituted or substituted monovalent hydrocarbon group having 1 to 10 carbon atoms such as an alkyl, aryl, or aralkyl group and may be the same or different. R is a divalent hydrocarbon group, such as an alkylene group, having 1 to 10 carbon atoms, preferably 1 to 6 carbon atoms. n is an integer of at least 2. Preferably, $R^1$ is a methyl group, an ethyl group or a phenyl group. n is an integer of at least 2, preferably at least 5. The upper limit of n is not critical and is preferably at 10,000, more preferably at 2,000 and most preferably at 1,000 in view of workability. As to the viscosity of component (A), the value obtained by measurement with Ostwald viscometer at 25° C. is preferably at at least 10 mm²/second, more preferably at least 50 mm²/second. If the viscosity is too low, not only a difficulty is involved in handling, but also terminal groups become large in number. Hence, increased amounts of components (B) and (C) to be added for subsequent reaction are needed and may result in poor economy. A favorable upper limit of viscosity is one corresponding to the degree of polymerization and liquid form is more preferred from the standpoint of reactivity and workability.

Component (B)

The organic compound of component (B) having a (meth) acrylic group and isocyanate group is an essential starting material for obtaining an organopolysiloxane compound, provided with photocurability at terminal ends, by reaction with component (A). Component (B) is represented by the following general formulas (2) and (3).

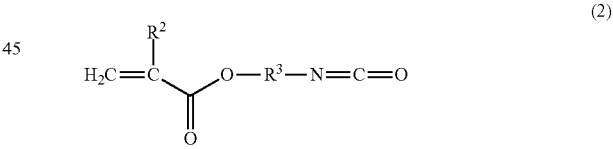

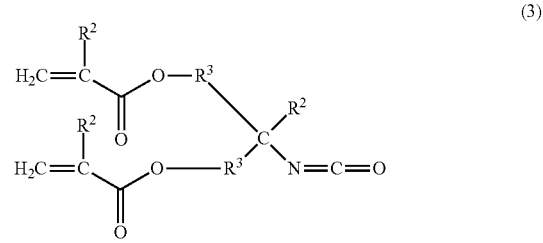

In the formulas, $R^2$ is independently a hydrogen atom or an unsubstituted or substituted monovalent hydrocarbon group having 1 to 3 carbon atoms such as an alkyl group, $R^3$ is independently an unsubstituted or substituted divalent hydrocarbon group having 1 to 20 carbon atoms such as an alkylene group. Preferably, $R^2$ is a hydrogen atom or a methyl group. $R^3$ is an alkylene group having preferably 1 to 5 carbon atoms, more preferably 1 to 3 carbon atoms.

Commercially sold products can be used as component (B) and include, for example, Karenz AOI (made by Showa Denko K.K., and in the formula (2), $R^2$=hydrogen atom and $R^3$=ethylene group) for the compound of the formula (2) and Karenz BEI (made by Showa Denko K. K., and in the formula (3), $R^2$=methyl group and $R^3$=methylene group) for the compound of the formula (3), although not limited thereto.

Component (C)

The organic compound of component (C) having a methoxy group and an isocyanate group in the molecule is an essential starting material for obtaining an organopolysiloxane compound imparted with condensation curability at terminal ends, by reaction with component (A). Component (C) is represented by the following general formula (4).

(4)

In the above formula, $R^1$ and $R^3$, respectively, have the same meanings as defined above, $R^4$ is an unsubstituted or substituted monovalent hydrocarbon group having 1 to 3 carbon atoms provided that $R^1$, $R^3$ and $R^4$ may be the same or different, and p is 0 or 1. $R^4$ is selected from a methyl group, an ethyl group, a propyl group and an isopropyl group, and is preferably a methyl group or an ethyl group, more preferably a methyl group so as to carry out condensation curing within a short time. With other hydrolyzable groups, curability becomes insufficient.

The organopolysiloxane compound according to the invention is prepared by mixing and reacting components (A), (B) and (C) with one another. In this case, the reaction is carried out under conditions that a ratio of the amino group equivalent $P_{NH}$ of component (A) and the isocyanate group equivalent $P_{NCO}$ of components (B) and (C) is within a range of $0.8 \leq (P_{NCO}/P_{NH})$, preferably $0.9 \leq (P_{NCO}/P_{NH}) \leq 1.5$. This is for the following reason. The reaction of components (A), (B) and (C) enables an organopolysiloxane compound capable of being cured with UV light and/or condensation to be obtained. If the ratio is less than 0.8, or if an amount of the amino group is larger, curability via photocuring or room temperature curing becomes poor, so that expected curability cannot be obtained. On the other hand, when the ratio exceeds 1.5, the isocyanate group-containing compounds are in excess amount, thus being disadvantageous in economy.

Moreover, the reaction is carried out in such a way that a molar ratio of component (B) and component (C) is within a range of 0.6 [component (B)/component (C)], preferably $0.8 \leq$ [component (B)/component (C)] $\leq 1.5$. This is for the following reason. The reaction of components (A), (B) and (C) enables an organopolysiloxane compound capable of being cured through UV light irradiation and/or condensation reaction to be obtained. Nevertheless, if the molar ratio is less than 0.6, or if component (C) is large in amount, curability with UV irradiation becomes poor, so that expected UV light curability cannot be obtained. If the molar ratio exceeds 1.5, good photocurability and room temperature curability are obtained, but resulting in poor economy.

The reaction occurs readily by mixing components (A), (B) and (C). The reaction temperature may be room temperature, at which no heating or cooling is needed, and may be heated to about 100° C., if necessary. The reaction time is not critical so far as the reaction is completed satisfactorily and is generally for about five minutes to two hours.

The organopolysiloxane compound obtained in this way is represented, for example, by the following formulas (6) and (7):

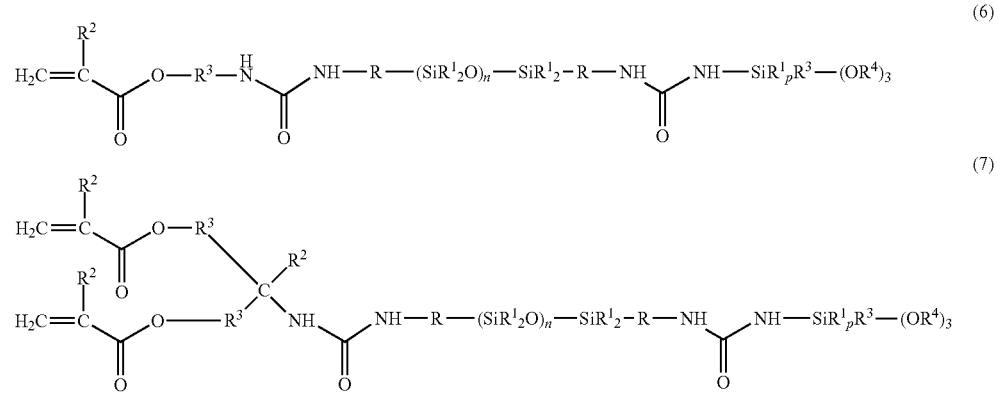

wherein R, $R^1$, $R^2$, $R^3$, $R^4$, n and p are as defined before, respectively. This organopolysiloxane compound can be conveniently used as base polymer of a curing composition.

In the case, the curing composition can comprise the following components (D) to (G) and, if necessary, component (H):

(D) 100 parts by weight of the organopolysiloxane compound obtained according to the above preparation method;

(E) 0.01 to 10 parts by weight of a photopolymerization initiator;

(F) 0.01 to 10 parts by weight of a curing catalyst;

(G) 1 to 30 parts by weight of a crosslinking agent (i.e. a silane of the formula (5) described hereinafter or its partial hydrolyzate); and, optionally, (H) 0.1 to 100 parts by weight of fumed silica.

Component (E) and the others of the curing composition are described in detail.

Component (E)

The photopolymerization initiator of component (E) is one that promotes photopolymerization of the acrylic group in the organopolysiloxane compound (D) obtained by reaction of components (A), (B) and (C) and imparted with photocurability and room temperature curability. As such an initiator, there can be used those well known in the art and including, for example, acetophenone, propiophenone, benzophenone, xanthol, fluorein, benzaldehyde, anthraquinone, triphenylamine, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4-dimethoxybenzophenone, 4-chloro-4-benzylbenzophenone, 3-chloroxanthone, 3,9-dichloroxanthone, 3-chloro-8-nonylxanthone, benzoin, benzoin methyl ether, benzoin butyl ether, bis(4-dimethylaminophenyl)ketone, benzyl methoxy ketal, 2-chlorothioxanthone, diethylacetophenone, 1-hydroxycyclohexyl phenyl ketone, 2-methyl-[4-(methylthio) phenyl]2-morpholino-1-propanone, 2,2-dimethoxy-2-phenylacetophenone, and diethoxyacetophenone.

This photopolymerization initiator is used in an amount of 0.01 to 10 parts by weight, preferably 0.1 to 5 parts by weight, per 100 parts by weight of the organopolysiloxane compound (D) obtained by reaction of components (A), (B) and (C). If less than 0.01 part by weight, no addition effect is obtained, resulting in poor curability with light. Over 10 parts by weight, the resulting silicone rubber becomes low in strength, thus leading not only to poor physical characteristics of the resulting cured product, but also to poor economy.

Component (F)

The curing catalyst of component (F) is used to promote the curing of the alkoxy group in the organopolysiloxane compound (D) obtained by reaction of components (A), (B) and (C). To this end, it is preferred to use those components which are used in silicone resin compositions capable of being cured in the presence of moisture as is well known in the art. As component (F), there are exemplified tin catalysts, bismuth catalysts and titanium catalysts, of which tin catalysts and bismuth catalysts are preferably used. Specific examples of the tin catalyst include tin naphthenate, tin caprylate, dibutyltin diacetate, dibutyltin dioctate, dibutyltin dilaurate, dibutyltin dioleate, diphenyltin diacetate, dibutyltin oxide, dibutyltin dimethoxide, dibutylbis(triethoxysiloxy)tin, and dibutyltin benzylmaleate. As a bismuth catalyst, bismuth tris (2-ethylhexanoate) or bismuth tris(neodecanoate) is preferred. If a titanium catalyst is chosen as component (F), no problem occurs in condensation curing, but if photocured, the titanium atom absorbs UV light, with the possibility that an appearance failure takes place. Specific examples of the titanium catalyst include titanic acid esters and titanium chelate compound such as tetraisopropoxy titanium, tetra-n-butoxy titanium, tetrabis(2-ethylhexoxy)titanium, dipropoxybis (acetylacetonate)titanium, and titanium isopropoxyoctylene glycol.

These curing catalysts may be used in a very small of catalytic amount. For instance, the catalyst is used within a range of 0.01 to 10 parts by weight, preferably 0.1 to 5 parts by weight, per 100 parts by weight of the organopolysiloxane compound (D) obtained by reaction of components (A), (B) and (C).

Component (G)

The silane of component (G) represented by the following general formula (5) or its partial hydrolyzate serves as a crosslinking agent in the composition of the invention.

$$R^5_{4-r}SiK_r \quad (5)$$

wherein $R^5$ is an unsubstituted or substituted monovalent hydrocarbon group having 1 to 10 carbon atoms, K is a hydrolyzable group and r is an integer of 2 to 4.

$R^5$ of the general formula (5) may be the same or different and are an unsubstituted or substituted monovalent hydrocarbon group such as an alkyl group, an alkenyl group, or an aryl group. Preferably, $R^5$ is a vinyl group, a methyl group, an ethyl group, a propyl group or a phenyl group. K is a hydrolyzable group. Specifically, mention is made of an alkoxy group such as a methoxy group, an ethoxy group, or a propoxy group, an alkenyloxime group such as an isopropenoxy group, or a 1-ethyl-2-methylvinyloxime group, and a ketoxime group such as a dimethylketoxime group, a methylethylketoxime group, or a methylisobutylketoxime group. Besides, mention is also made of hydrolyzable groups including an acyloxy group such as an acetoxy group, a propionoxy group, a butyroyloxy group, or a benzoyloxime group, an amino group such as a dimethylamino group, or a diethylamino group, an aminoxy group such as a dimethylaminoxy group, or a diethylaminoxy group, and an amide group such as an N-methylacetamide group, an N-ethylacetamide group, or an N-methylbenzamide group. r is an integer of 2 to 4. Of these, an alkoxy group is preferred and a methoxy, ethoxy or propoxy group is more preferred. Most preferably, a methoxy group is mentioned. The crosslinking agent of component (G) may be either a silane or a siloxane obtained by partial hydrolysis thereof. The siloxane may be linear, branched or cyclic and these compounds may be used singly or in combination of at least two.

The amount of component (G) is preferably at 1 to 30 parts by weight, more preferably at 3 to 15 parts by weight, per 100 parts by weight of the organopolysiloxane compound (D) obtained by reaction of components (A), (B) and (C). If component (G) is less than 1 part by weight, gelation may occur during the course of preparation or storage of the composition and the elastomer obtained from the resulting composition may not show intended physical properties. In contrast, if the amount is larger than 30 parts by weight, the shrinking percentage during curing of the composition becomes great and the elasticity of the cured product becomes low. The amount should be within a range of 1 to 30 parts by weight.

Component (H)

Fumed silica of component (H) is a component used to impart appropriate degrees of fluidity, rubbery physical properties and adhesiveness to the composition.

Component (H) used may be either one whose surface is not treated, or one whose surface is treated with a treating agent (a silane, or a silazane). In this connection, however, fumed silica, which is added to component (A) and through which UV light does not transmit, impedes curing with UV light and thus, it is recommended not to use it. The amount of component (H) is preferably at 0.1 to 100 parts by weight, more preferably at 1 to 30 parts by weight and most preferably at 2 to 15 parts by weight, per 100 parts by weight of the organopolysiloxane compound (D) obtained by reaction of components (A), (B) and (C). If component (H) is less than 0.1 part by weight, there may be some cases where its reinforcement improving effect does not become satisfactory. If the amount exceeds 100 parts by weight, the viscosity of the resulting composition becomes so high that workability may low.

Other Formulating Agents

The curing composition of the invention can be formulated, aside from components (D) to (H), a variety of additives known per se within ranges of amount not impairing curability. For instance, for the purpose of controlling physical properties, a thixotropy imparting agent, a heat resistance improver, and a colorant may be added. For the purpose of imparting adhesiveness, known silane coupling agents may be added, thereby imparting adhesiveness.

Examples of the silane coupling agent include (meth)acrylsilane coupling agents, epoxysilane coupling agents, aminosilane coupling agents, and mercaptosilane coupling agents. Specifically, mention is made of 3-glycidoxypropyltrimethoxysilane, 3-glycidoxypropyltriethoxysilane, 3-methacryloxypropyltrimethoxysilane, 3-methacryloxypropyltriethoxysilane, 3-acryloxypropyltrimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-ureidopropyltriethoxysilane, 3-chloropropyltriethoxysilane, 3-mercaptopropyltrimethoxysilane, and 3-isocyanatopropyltriethoxysilane.

The curing composition of the invention can be obtained by uniformly mixing the respective components set out above and readily cured within a short time of one to 20 seconds by UV irradiation to provide silicone rubber. Moreover, the composition is cured in the presence of moisture in air and, for example, a deep portion, at which UV light could not arrive, can be cured with time. With respect to the method for preparing an organopolysiloxane compound and a curing composition making use of the compound according to the invention, the preparation is easy and stable, so that there can be provided an organopolysiloxane compound, which can be prepared readily and stably and can be conveniently used in a curing composition imparted both with photocurability and room temperature curability. The composition using the thus obtained organopolysiloxane compound is very useful when applied as those compositions meeting various requirements such as of a sealing agent, a coating agent, and a potting agent.

EXAMPLES

In the following Examples, the viscosity of reaction starting materials is a value measured with Ostwald viscometer at 25° C., the viscosity of an organopolysiloxane compound obtained is a value measured with a rotary viscometer at 25° C., a non-volatile content is a value calculated from a change in weight after exposure under conditions of 105° C. and three hours. The color and appearance of an obtained organopolysiloxane compound was visually confirmed. In order to confirm photocurability of an obtained organopolysiloxane compound provided with photocurability and room temperature curability, 2 parts by weight of diethoxyacetophenone (photopolymerization initiator) was added to 100 parts by weight of the organopolysiloxane provided with photocurability and room temperature curability and mixed, and was irradiated three times with UV light at a speed of 1 m/minute (irradiation energy amount was about 1,500 mJ/cm$^2$) by use of UV irradiator ASE-20 (commercial name of GS Yuasa Corporation), followed by measurement of a rubber hardness according to the method described in JIS K6249. For the confirmation of condensation curability of an obtained organopolysiloxane compound provided with photocurability and room temperature curability, 0.1 part by weight of dibutyl tin dimethoxide was added to 100 parts by weight of the organopolysiloxane compound provided with photocurability and room temperature curability under hermetically closed conditions and allowed to stand in air, followed by measuring a tack-free time according to the method described in JIS A5758. A usable range was evaluated by setting a hardness after UV irradiation at at least ten when determined by durometer A and a tack-free time at up to 30 minutes.

Example 1

16.4 parts by weight of an organic compound of component (B) having one acrylic group and one isocyanate group in the molecule (commercial name: Karenz AOI, made by Showa Denko K.K.) and 23.8 parts by weight of 3-isocyanate propyltrimethoxysilane (commercial name: KBM-9007A, made by Shin-Etsu Chemical Co., Ltd.) of component (C) were pre-mixed and subsequently added to 100 parts by weight of an organopolysiloxane of component (A) having a viscosity of 12 mm$^2$/second at 25° C. and blocked with an amino group at opposite ends thereof (commercial name: KF-8010, made by Shin-Etsu Chemical Co., Ltd., i.e. a compound of the formula (1) wherein R$^1$=methyl group, R=propylene group, and n is 14 on average), followed by agitation at room temperature for 30 minutes to obtain intended organopolysiloxane compound (1) (hereinafter referred to as polysiloxane (1)).

The ratio of an amino group equivalent $P_{NH}$ in component (A) and an isocyanate group equivalent $P_{NCO}$ of components (B) and (C) is such that $(P_{NCO}/P_{NH})=1.0$ and a molar ratio of component (B) and component (C) is such that [component (B)/component (C)]=1.0.

Example 2

3.2 parts by weight of an organic compound of component (B) having one acrylic group and one isocyanate group in the molecule (commercial name: Karenz AOI, made by Showa Denko K.K.) and 4.7 parts by weight of 3-isocyanate propyltrimethoxysilane (commercial name: KBM-9007A, made by Shin-Etsu Chemical Co., Ltd.) of component (C) were pre-mixed and subsequently added to 100 parts by weight of an organopolysiloxane of component (A) having a viscosity of 90 mm$^2$/second at 25° C. and blocked with an amino group at opposite ends thereof (commercial name: KF-8012, made by Shin-Etsu Chemical Co., Ltd., i.e. a compound of the formula (1) wherein R$^1$=methyl group, R=propylene group, and n is 60 on average), followed by agitation at room temperature for 30 minutes to obtain intended organopolysiloxane compound (2) (hereinafter referred to as polysiloxane (2)).

The ratio of an amino group equivalent $P_{NH}$ in component (A) and an isocyanate group equivalent $P_{NCO}$ of components (B) and (C) is such that $(P_{NCO}/P_{NH})=1.0$ and a molar ratio of component (B) and component (C) is such that [component (B)/component (C)]=1.0.

Example 3

5.4 parts by weight of an organic compound of component (B) having two acrylic groups and one isocyanate group in the molecule (commercial name: Karenz BEI, made by Showa Denko K.K.) and 4.7 parts by weight of 3-isocyanate propyltrimethoxysilane (commercial name: KBM-9007A, made by Shin-Etsu Chemical Co., Ltd.) of component (C) were pre-mixed and subsequently added to 100 parts by weight of an organopolysiloxane of component (A) having a viscosity of 90 mm$^2$/second at 25° C. and blocked with an amino group at opposite ends thereof (commercial name: KF-8012, made by Shin-Etsu Chemical Co., Ltd.), followed by agitation at room temperature for 30 minutes to obtain intended organopolysiloxane compound (3) (hereinafter referred to as polysiloxane (3)).

The ratio of an amino group equivalent $P_{NH}$ in component (A) and an isocyanate group equivalent $P_{NCO}$ of components (B) and (C) is such that $(P_{NCO}/P_{NH})=1.0$ and a molar ratio of component (B) and component (C) is such that [component (B)/component (C)]=1.0.

Example 4

2.6 parts by weight of an organic compound of component (B) having one acrylic group and one isocyanate group in the molecule (commercial name: Karenz AOI, made by Showa Denko K.K.) and 5.6 parts by weight of 3-isocyanate propyltrimethoxysilane (commercial name: KBM-9007A, made by Shin-Etsu Chemical Co., Ltd.) of component (C) were premixed and subsequently added to 100 parts by weight of an organopolysiloxane of component (A) having a viscosity of 90 mm$^2$/second at 25° C. and blocked with an amino group at opposite ends thereof (commercial name: KF-8012, made by Shin-Etsu Chemical Co., Ltd.), followed by agitation at room temperature for 30 minutes to obtain intended organopolysiloxane compound (4) (hereinafter referred to as polysiloxane (4)).

The ratio of an amino group equivalent $P_{NH}$ in component (A) and an isocyanate group equivalent $P_{NCO}$ of components (B) and (C) is such that $(P_{NCO}/P_{NH})=1.0$ and a molar ratio of component (B) and component (C) is such that [component (B)/component (C)]=0.67.

Example 5

3.8 parts by weight of an organic compound of component (B) having one acrylic group and one isocyanate group in the molecule (commercial name: Karenz AOI, made by Showa Denko K.K.) and 3.7 parts by weight of 3-isocyanate propyltrimethoxysilane (commercial name: KBM-9007A, made by Shin-Etsu Chemical Co., Ltd.) of component (C) were premixed and subsequently added to 100 parts by weight of an organopolysiloxane of component (A) having a viscosity of 90 mm$^2$/second at 25° C. and blocked with an amino group at opposite ends thereof (commercial name: KF-8012, made by Shin-Etsu Chemical Co., Ltd.), followed by agitation at room temperature for 30 minutes to obtain intended organopolysiloxane compound (5) (hereinafter referred to as polysiloxane (5)).

The ratio of an amino group equivalent $P_{NH}$ in component (A) and an isocyanate group equivalent $P_{NCO}$ of components (B) and (C) is such that $(P_{NCO}/P_{NH})=1.0$ and a molar ratio of component (B) and component (C) is such that [component (B)/component (C)]=1.5.

Example 6

2.6 parts by weight of an organic compound of component (B) having one acrylic group and one isocyanate group in the molecule (commercial name: Karenz AOI, made by Showa Denko K.K.) and 3.8 parts by weight of 3-isocyanate propyltrimethoxysilane (commercial name: KBM-9007A, made by Shin-Etsu Chemical Co., Ltd.) of component (C) were premixed and subsequently added to 100 parts by weight of an organopolysiloxane of component (A) having a viscosity of 90 mm$^2$/second at 25° C. and blocked with an amino group at opposite ends thereof (commercial name: KF-8012, made by Shin-Etsu Chemical Co., Ltd.), followed by agitation at room temperature for 30 minutes to obtain intended organopolysiloxane compound (6) (hereinafter referred to as polysiloxane (6)).

The ratio of an amino group equivalent $P_{NH}$ in component (A) and an isocyanate group equivalent $P_{NCO}$ of components (B) and (C) is such that $(P_{NCO}/P_{NH})=0.81$ and a molar ratio of component (B) and component (C) is such that [component (B)/component (C)]=1.0.

Example 7

4.7 parts by weight of an organic compound of component (B) having one acrylic group and one isocyanate group in the molecule (commercial name: Karenz AOI, made by Showa Denko K.K.) and 7.0 parts by weight of 3-isocyanate propyltrimethoxysilane (commercial name: KBM-9007A, made by Shin-Etsu Chemical Co., Ltd.) of component (C) were premixed and subsequently added to 100 parts by weight of an organopolysiloxane of component (A) having a viscosity of 90 mm$^2$/second at 25° C. and blocked with an amino group at opposite ends thereof (commercial name: KF-8012, made by Shin-Etsu Chemical Co., Ltd.), followed by agitation at room temperature for 30 minutes to obtain intended organopolysiloxane compound (7) (hereinafter referred to as polysiloxane (7)).

The ratio of an amino group equivalent $P_{NH}$ in component (A) and an isocyanate group equivalent $P_{NCO}$ of components (B) and (C) is such that $(P_{NCO}/P_{NH})=1.48$ and a molar ratio of component (B) and component (C) is such that [component (B)/component (C)]=1.0.

Comparative Example 1

In Example 2, component (A) was changed to 100 parts by weight of an organopolysiloxane having a viscosity of 100 mm$^2$/second at 25° C. and blocked with a hydroxyl group at opposite ends thereof, to which 3.4 parts by weight of an organic compound of component (B) having one acrylic group and one isocyanate group in the molecule (commercial name: Karenz AOI, made by Showa Denko K.K.) and 4.8 parts by weight of 3-isocyanate propyltrimethoxysilane (commercial name: KBM-9007A, made by Shin-Etsu Chemical Co., Ltd.) of component (C) were added after premixing, followed by agitation at room temperature for 30 minutes to obtain intended organopolysiloxane compound (8) (hereinafter referred to as polysiloxane (8)).

The ratio of a hydroxy group equivalent $P_{OH}$ in component (A) and an isocyanate group equivalent $P_{NCO}$ of components (B) and (C) is such that $(P_{NCO}/P_{OH})=1.0$ and a molar ratio of component (B) and component (C) is such that [component (B)/component (C)]=1.0.

Comparative Example 2

In the same manner as in Example 2 except that the amounts of the organic compound of component (B) having one acrylic group and one isocyanate group in the molecule (commercial name: Karenz AOI, made by Showa Denko K.K.) and 3-isocyanate propyltrimethoxysilane (commercial name: KBM-9007A, made by Shin-Etsu Chemical Co., Ltd.) of component (C) were changed to 1.6 parts by weight and 2.4 parts by weight, respectively, there was obtained intended organopolysiloxane compound (9) (hereinafter referred to as organopolysiloxane (9)).

The ratio of an amino group equivalent $P_{NH}$ in component (A) and an isocyanate group equivalent $P_{NCO}$ of components (B) and (C) is such that $(P_{NCO}/P_{NH})=0.50$ and a molar ratio of component (B) and component (C) is such that [component (B)/component (C)]=1.0.

Comparative Example 3

In the same manner as in Example 2 except that the amounts of the organic compound of component (B) having one acrylic group and one isocyanate group in the molecule (commercial name: Karenz AOI, made by Showa Denko K.K.) and 3-isocyanate propyltrimethoxysilane (commercial name: KBM-9007A, made by Shin-Etsu Chemical Co., Ltd.) of component (C) were changed to 2.0 parts by weight and 6.5 parts by weight, respectively, there was obtained intended organopolysiloxane compound (10) (hereinafter referred to as organopolysiloxane (10)).

The ratio of an amino group equivalent $P_{NH}$ in component (A) and an isocyanate group equivalent $P_{NCO}$ of components (B) and (C) is such that $(P_{NCO}/P_{NH})=1.0$ and a molar ratio of component (B) and component (C) is such that [component (B)/component (C)]=0.45.

The test results of the examples and comparative examples are summarized in Tables 1, 2.

TABLE 1

| | Example | | | | | | |
|---|---|---|---|---|---|---|---|
| | 1 | 2 | 3 | 4 | 5 | 6 | 7 |
| Appearance | Transparent liquid | Transparent liquid | Transparent liquid | Transparent liquid | Transparent liquid | Transparent liquid | Transparent liquid |
| Viscosity (mPa · s) | 12,000 | 5,000 | 5,500 | 4,700 | 6,500 | 4,000 | 4,800 |
| Non-volatile content (%) | 97.8 | 98.5 | 98.4 | 98.5 | 98.3 | 98.4 | 98.7 |
| Nature after UV irradiation | Plastic | Rubbery | Rubbery | Rubbery | Rubbery | Rubbery | Rubbery |
| Hardness after UV irradiation (A: Durometer A) | 95 (A) | 58 (A) | 68 (A) | 40 (A) | 75 (A) | 20 (A) | 55 (A) |
| Tack-free time (minutes) | 8 | 12 | 12 | 15 | 10 | 30 | 20 |

TABLE 2

| | Comparative Example | | |
|---|---|---|---|
| | 1 | 2 | 3 |
| Appearance | Transparent liquid | Transparent liquid | Transparent liquid |
| Viscosity (mPa · s) | 95 | 2,500 | 4,500 |
| Non-volatile content (%) | 97.8 | 98.5 | 98.3 |
| Nature after UV irradiation | Liquid | Gelled | Gelled |
| Hardness after (A: Durometer A) UV irradiation (C: Asker C) | Unmeasurable | Unmeasurable | 2 (C) |
| Tack-free time (minutes) | Unmeasurable | 60 | 15 |

The organopolysiloxane compounds obtained in Examples 1, 2 and Comparative Examples 2, 3 were formulated into compositions according to the following procedure.

Example 8

0.3 parts by weight of diethoxyacetophenone (photopolymerization initiator) of component (E), 0.2 parts by weight of dibutyl tin dioctoate of component (F) and 4 parts by weight of vinyltrimethoxysilane of component (D) were added to 140.2 parts by weight of polysiloxane (1) obtained in Example 1 and uniformly mixed to prepare siloxane composition (a).

Example 9

0.3 parts by weight of diethoxyacetophenone (photopolymerization initiator) of component (E), 0.2 parts by weight of dibutyl tin dioctoate of component (F) and 4 parts by weight of vinyltrimethoxysilane of component (D) were added to 107.9 parts by weight of polysiloxane (2) obtained in Example 2 and uniformly mixed to prepare siloxane composition (b).

Example 10

0.3 parts by weight of diethoxyacetophenone (photopolymerization initiator) of component (E), 0.3 parts by weight of bismuth tris(neodecanoate) of component (F) and 4 parts by weight of vinyltrimethoxysilane of component (D) were added to 107.9 parts by weight of polysiloxane (2) obtained in Example 2 and uniformly mixed to prepare siloxane composition (c).

Comparative Example 4

0.3 parts by weight of diethoxyacetophenone (photopolymerization initiator) of component (E), 0.2 parts by weight of dibutyl tin dioctoate of component (F) and 4 parts by weight of vinyltrimethoxysilane of component (D) were added to 104 parts by weight of polysiloxane (9) obtained in Comparative Example 2 and uniformly mixed to prepare siloxane composition (d).

Comparative Example 5

0.3 parts by weight of diethoxyacetophenone (photopolymerization initiator) of component (E), 0.2 parts by weight of dibutyl tin dioctoate of component (F) and 4 parts by weight of vinyltrimethoxysilane of component (D) were added to 108.5 parts by weight of polysiloxane (10) obtained in Comparative Example 3 and uniformly mixed to prepare siloxane composition (e).

The thus obtained siloxane compositions (a) to (e) were each irradiated three times with UV light at a speed of 1 m/minute (irradiation energy amount: about 1,500 mJ/cm$^2$) by use of a UV irradiator ASE-20 (commercial name of GS Yuasa Corporation) and cured (UV curing), further cured under conditions of 23±2° C. and 50±5% RH over seven days (RTV curing), and subjected to measurement of rubber physical properties according to JIS K6249. In order to confirm the storage stability in an uncured state, the uncured compositions were each stored at 70° C. for seven days and cured in a manner as set out above, followed by measurement of rubber physical properties. The resulting rubbers were subjected to several endurance tests to confirm rubber physical properties. The endurance tests were carried out under conditions indicated below.

Heat-resistance test: 150° C.×1,000 hours

Moisture resistance test: 85° C., 85% RH×1,000 hours

The results are shown in Table 3.

TABLE 3

|  |  | Example | | | Comparative Example | |
|---|---|---|---|---|---|---|
|  |  | 8 | 9 | 10 | 4 | 5 |
| Initial | Hardness (Durometer A) | 95 | 65 | 58 | 20 | 70 |
|  | Elongation at breakage (%) | 5 | 15 | 20 | 50 | 20 |
|  | Tensile strength (MPa) | 4.3 | 0.9 | 0.6 | 0.4 | 0.7 |
| After storage | Hardness (Durometer A) | 85 | 58 | 49 | 12 | Curing failure |
|  | Elongation at breakage (%) | 10 | 25 | 30 | 70 |  |
|  | Tensile strength (MPa) | 3.5 | 0.8 | 0.5 | 0.5 |  |
| After heat resistance test 150° C. × 1,000 hrs. | Hardness (Durometer A) | 75 | 45 | 35 | 13 | 50 |
|  | Elongation at breakage (%) | 15 | 30 | 40 | 50 | 20 |
|  | Tensile strength (MPa) | 4.0 | 0.6 | 0.4 | 0.3 | 0.2 |
| After moisture resistance test 85° C., 85% RH × 1,000 hrs. | Hardness (Durometer A) | 95 | 35 | 28 | Unmeasurable | 15 |
|  | Elongation at breakage (%) | 5 | 40 | 40 |  | 60 |
|  | Tensile strength (MPa) | 4.7 | 0.6 | 0.4 |  | 0.1 |

Japanese Patent Application No. 2011-260559 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing an organopolysiloxane compound, which comprising mixing (A) an organopolysiloxane of the following formula (1):

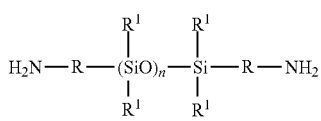

(1)

wherein $R^1$ is an unsubstituted or substituted monovalent hydrocarbon group having 1 to 10 carbon atoms and may be the same or different, R is a divalent hydrocarbon group having 1 to 10 carbon atoms, and n is an integer of at least 2, with (B) an organic compound of the following general formula (2) or (3):

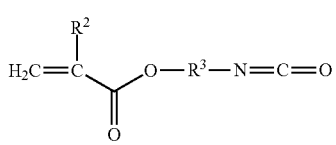

(2)

wherein $R^2$ is a hydrogen atom or an unsubstituted or substituted monovalent hydrocarbon group having 1 to 3 carbon atoms, and $R^3$ is an unsubstituted or substituted divalent hydrocarbon group having 1 to 20 carbon atoms,

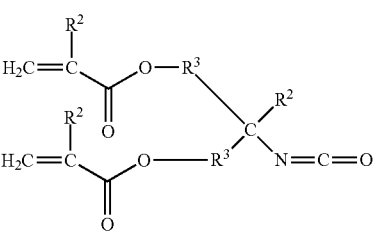

(3)

wherein $R^2$ and $R^3$, respectively, have the same meanings as defined above, and (C) an organic compound of the following general formula (4):

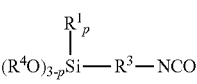

(4)

wherein $R^1$ and $R^3$, respectively, have the same meanings as defined above, $R^4$ is an unsubstituted or substituted monovalent hydrocarbon group having 1 to 3 carbon atoms, and p is 0 or 1, thereby preparing an organopolysiloxane compound, wherein components (A), (B) and (C) are reacted with one another under conditions that a ratio between an amino group equivalent $P_{NH}$ in component (A) and an isocyanate group equivalent $P_{NCO}$ in components (B) and (C) is such that 0.8 ($P_{NCO}/P_{NH}$) and a molar ratio between component (B) and component (C) is such that 0.6≤[component (B)/component (C)].

2. A curing composition comprising:
   (D) 100 parts by weight of an organopolysiloxane compound obtained by the preparation method of claims 1;
   (E) 0.01 to 10 parts by weight of a photopolymerization initiator;
   (F) 0.01 to 10 parts by weight of a curing catalyst; and
   (G) 1 to 30 parts by weight of a silane represented by the following general formula (5) or a partial hydrolyzate thereof, $$R^5{}_{4-r}SiK_r \qquad (5)$$

wherein $R^5$ is an unsubstituted or substituted monovalent hydrocarbon group having 1 to 10 carbon atoms, K is a hydrolyzable group, and r is an integer of 2 to 4.

3. The curing composition of claim 2, further comprising 0.1 to 100 parts by weight of (H) fumed silica per 100 parts by weight of component (A).

4. A part bonded and/or sealed with a cured product of the curing composition defined in claim 2 or 3.

* * * * *